US010484850B2

(12) United States Patent
Kwoczek (10) Patent No.: US 10,484,850 B2
(45) Date of Patent: Nov. 19, 2019

(54) APPARATUS, METHOD AND COMPUTER PROGRAM FOR PROVIDING TRANSMISSION PARAMETERS BETWEEN VEHICLES

(71) Applicant: VOLKSWAGEN AKTIENGESELLSCHAFT, Wolfsburg (DE)

(72) Inventor: Andreas Kwoczek, Lehre (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 15/753,559

(22) PCT Filed: Aug. 26, 2016

(86) PCT No.: PCT/EP2016/070177
§ 371 (c)(1),
(2) Date: Feb. 20, 2018

(87) PCT Pub. No.: WO2017/032875
PCT Pub. Date: Mar. 2, 2017

(65) Prior Publication Data
US 2018/0242127 A1 Aug. 23, 2018

(30) Foreign Application Priority Data
Aug. 27, 2015 (DE) .................. 10 2015 114 285

(51) Int. Cl.
*H04W 4/46* (2018.01)
*H04W 76/10* (2018.01)
(Continued)

(52) U.S. Cl.
CPC .............. *H04W 4/46* (2018.02); *H04L 69/14* (2013.01); *H04W 76/10* (2018.02); *H04L 67/12* (2013.01); *H04W 76/14* (2018.02)

(58) Field of Classification Search
CPC ... H04W 4/46; H04W 72/0406; H04W 76/14; H04W 16/14; H04W 76/10; H04W 76/12; H04W 76/15; H04L 67/12; H04L 69/14
See application file for complete search history.

(56) References Cited

U.S. PATENT DOCUMENTS

2009/0227282 A1* 9/2009 Miyabayashi ...... H04L 63/0492
455/552.1
2013/0120159 A1* 5/2013 Stahlin .................. G08G 1/161
340/902

(Continued)

FOREIGN PATENT DOCUMENTS

DE 102008061304 A1 7/2009
DE 102010038640 A1 2/2012
(Continued)

OTHER PUBLICATIONS

Goldrick et al., Independent Active Ageing—the Role of 5G and Autonomous Vehicles, IEEE COMSOC MMTC E-Letter vol. 10, No. 4, Jul. 2015, pp. 35-38 (Year: 2015).*
(Continued)

*Primary Examiner* — Salvador E Rivas
*Assistant Examiner* — Lalita W Pace
(74) *Attorney, Agent, or Firm* — Barnes & Thornburg LLP (57) ABSTRACT

An apparatus, method, and computer program for a transportation vehicle for vehicle-to-vehicle data communication by the transportation vehicle. The apparatus for vehicle-to-vehicle data communication by a transportation vehicle includes a first radio interface for the data communication of the transportation vehicle with a further transportation vehicle using a first data communication protocol and with a first transmission capacity; a second radio interface for the data communication of the transportation vehicle with the further transportation vehicle using a second data commu-
(Continued)

nication protocol and with a second transmission capacity, wherein the second transmission capacity is greater than the first transmission capacity; and a device for obtaining data messages about a status of transportation vehicles in surroundings of the transportation vehicle via the first radio interface. The data messages include pseudonym certificates for a vehicle-to-vehicle data communication which allow temporary identification of the transportation vehicles in the surroundings of the transportation vehicle.

30 Claims, 2 Drawing Sheets

(51) Int. Cl.
*H04L 29/06* (2006.01)
*H04L 29/08* (2006.01)
*H04W 76/14* (2018.01)

(56) References Cited

U.S. PATENT DOCUMENTS

| | | | |
|---|---|---|---|
| 2014/0244747 A1* | 8/2014 | Aggarwal | H04L 67/22 709/204 |
| 2015/0032289 A1* | 1/2015 | Lotz | G08G 1/0112 701/1 |
| 2015/0296411 A1* | 10/2015 | Meyer | G08G 1/0112 370/336 |
| 2015/0365986 A1* | 12/2015 | Lee | H04W 72/085 370/329 |
| 2016/0212596 A1* | 7/2016 | Brahmi | H04W 72/0406 |
| 2017/0230803 A1* | 8/2017 | Calabuig Gaspar | H04W 4/046 |
| 2018/0167913 A1* | 6/2018 | Ying | H04W 12/06 |

FOREIGN PATENT DOCUMENTS

| | | |
|---|---|---|
| DE | 102011003624 A1 | 8/2012 |
| DE | 102011116637 A1 | 4/2013 |
| DE | 102014200226 A1 | 7/2015 |

OTHER PUBLICATIONS

Mir et al., "LTE and IEEE 802.11p for vehicular networking: a performance evaluation," Journal on Wireless Communications and Networking, 2014, pp. 1-15 (Year: 2014).*
ETSI EN 302 637-2; Intelligent Transport Systems (ITS); Vehicular Communications; Basic Set of Applications; Part 2: Specification of Cooperative Awareness Basic Service; Nov. 30, 2014; pp. 1-44.
ETSI TS 103 097; Intelligent Transport Systems (ITS); Security; Security Header and Certificate Formats; Apr. 1, 2013; pp. 2013-2014.
Search Report for German Patent Application No. 10 2015 114 285.6; dated Jun. 8, 2016.
Search Report for International Patent Application No. PCT/EP2016/070177; dated Oct. 18, 2016.

* cited by examiner

APPARATUS, METHOD AND COMPUTER PROGRAM FOR PROVIDING TRANSMISSION PARAMETERS BETWEEN VEHICLES

PRIORITY CLAIM

This patent application is a U.S. National Phase of International Patent Application No. PCT/EP2016/070177, filed 26 Aug. 2016, which claims priority to German Patent Application No. 10 2015 114 285.6, filed 27 Aug. 2015, the disclosures of which are incorporated herein by reference in their entireties.

SUMMARY

Illustrative embodiments relate to an apparatus, a method, and a computer program for a vehicle-to-vehicle-data communication of an automobile.

BRIEF DESCRIPTION OF THE DRAWINGS

Disclosed embodiments are described in more detail in the following with reference to the drawings, in which.

DETAILED DESCRIPTION

A vehicle-to-vehicle-data communication (Car2Car, C2C, or Vehicle2Vehicle, V2V) and vehicle-to-infrastructure-data communication (Car2Infrastructure, C2I or Vehicle- 2Roadside, V2R) are a hotspot of automobile research in the 21st century. The data communication between transportation vehicles or between transportation vehicles or traffic infrastructure enables a plurality of new possibilities, for example, a coordination of transportation vehicles among each other or a data communication of transportation vehicles with the traffic infrastructure, for example, to provide traffic jam warnings to the transportation vehicles. Here, transportation vehicles able to do C2C or C2I (summarized under vehicle-to-X-data communication, Car2X, C2X or Vehicle2X, V2X) comprise a transmit and receive unit to be able to communicate with other transportation vehicles, for example, via direct radio connections or mobile radio systems. The data communication may here, for example, be limited between transportation vehicles or between transportation vehicles and traffic infrastructure within a radius of a few hundred meters. Here, frequently periodic status messages are applied, so called Cooperative Awareness Messages (CAM) using which a status of the transportation vehicle, like, e.g., its position, is transmitted periodically. The data communication between transportation vehicles via C2C or C2I may be executed encryptedly and may be secured via certificates, for example, via long-term certificates (LTC) or short-term certificates valid only for a temporally restricted period, so-called Pseudonym Certificates (PC).

Modern transportation vehicles are frequently equipped with a plurality of sensors which record most different data of the automobile, for example, speed, acceleration, fuel consumption or position, but also more data-intensive data like, e.g., video data or the distance of transportation vehicles in an environment of the transportation vehicle. Those data may in some cases be too big to be transmitted timely by the technology implemented for status messages.

There may be a demand for providing an improved concept to enable a transmission of data which comprise a higher requirement with respect to a transmission capacity or latency. This is solved by apparatuses, methods and computer programs according to the independent claims.

For a data transmission via the direct device-to-device-connections, in some disclosed embodiments the data connection has to be set up. Disclosed embodiments are based on a transmission of transmission parameters between automobiles via a first radio interface, for example, based on a vehicle-to-vehicle communication system. On the basis of these transmission parameters, in at least some disclosed embodiments a data connection may be set up.

For transmitting the transmission parameters addressing the automobile is required. Disclosed embodiments here utilize Pseudonym Certificates transmitted periodically in Cooperative Awareness Messages in vehicle-to-vehicle communication. These CAM include a pseudonym allocated to the automobile together with the motion vector and the location. In at least some disclosed embodiments, the transportation vehicles determine a map of the transportation vehicles in the environment based on the locations and the motion vectors. Some disclosed embodiments may here utilize the pseudonym certificate to uniquely address the transportation vehicles via the vehicle-to-vehicle-interface and to ask for the transmission of the sensor data on a mobile radio channel.

Disclosed embodiments may, for example, acquire this by providing transmission parameters relating to a data communication on a second radio interface via a first radio interface. An apparatus for a vehicle-to-vehicle-data communication may be configured, according to disclosed embodiments, to communicate with a further automobile via a first radio interface and via a second radio interface. Here, the first radio interface may, for example, provide a direct communication between the transportation vehicles, with a lower data transmission capacity, and the second radio interface may provide a data communication with a higher transmission capacity, may require a dedicated connection setup before a data transmission, however. If, for example, data is to be transmitted which requires the higher transmission capacity, then the apparatus may transfer the transmission parameters to the further automobile and set up a data communication connection via the second radio interface to the further automobile based on the transmission parameters.

Disclosed embodiments provide an apparatus for a vehicle-to-vehicle-data communication of an automobile. The apparatus comprises a first radio interface for a data communication of the automobile with a further automobile via a first data communication protocol and with a first transmission capacity. The apparatus comprises a second radio interface for a data communication of the automobile with the further automobile via a second data communication protocol and with a second transmission capacity. The second transmission capacity is greater than the first transmission capacity. The apparatus comprises a device which is configured to receive data messages on a status of automobiles in an environment of the automobile via the first radio interface. The data messages include pseudonym certificates of a vehicle-to-vehicle-data communication. The pseudonym certificates enable a temporary identification of the automobiles in the environment of the automobile. The device is further configured to provide, via the first radio interface, transmission parameters regarding a data communication between the automobile and the further automobile via the second radio interface, based on addressing the further automobile based on the pseudonym certificates. The apparatus may, for example, enable to identify transportation vehicles in an environment of the automobile using their pseudonym certificates and to transmit the transmission parameters with the help of the transmission parameters (as addressing) to same. For example, the control module may be configured to transmit the transmission parameters if data is to be transmitted which makes a higher transmission capacity necessary. For example, the control module may be configured to identify automobiles in an environment of the automobile providing data messages via the pseudonym certificates and address or approach the same via the pseudonym certificates.

Disclosed embodiments provide an apparatus for a vehicle-to-vehicle-data communication of an automobile. The apparatus comprises a first radio interface for a data communication of the automobile with a further automobile via a first data communication protocol and with a first transmission capacity. The apparatus further comprises a second radio interface for a data communication of the automobile with the further automobile via a second data communication protocol and with a second transmission capacity. The second transmission capacity is greater than the first transmission capacity. The apparatus further comprises a device for providing, via the first radio interface, transmission parameters regarding a data communication between the automobile and the further automobile via the second radio interface. The apparatus may, for example, enable to set up a second data communication connection between the automobile and the further automobile, for example, to transmit sensor data for which the transmission capacity of the first radio interface is not sufficient.

In some disclosed embodiments, the device is configured to receive data messages on a status of automobiles in an environment of the automobile via the first radio interface. The data messages may, for example, include a (temporary) identification of the automobiles in an environment of the automobile, a position and a motion vector or, for example, a note regarding available sensor data which may be transmitted via the second radio interface, for example.

In some disclosed embodiments, data messages may include digital short-term certificates for a temporary identification of the automobiles in the environment of the automobile. The device may be configured to provide the transmission parameters to the further automobile based on the digital short-term certificates. The device may, for example, use the digital short-term certificates to address a data message to a specific receiver on a communication channel shared by several automobiles. Based thereon, the same may, for example, set up a data communication connection via the second radio interface.

In at least some disclosed embodiments, the digital short-term certificates may correspond to pseudonym certificates of a vehicle-to-vehicle-data communication. The pseudonym certificates may, for example, be detected by the further automobile, if they are utilized by the same when providing data messages, and may consequently be used for addressing the further automobile. The pseudonym certificates may, for example, be valid for a limited period and an automobile may, for example, utilize several pseudonym certificates at the same time. Pseudonym certificates may, for example, include an identification unique for one transportation vehicle. Pseudonym certificates may, for example, correspond to temporarily valid sender certificates for the authentication of automobiles.

In some disclosed embodiments, data messages on the status may further include information on a position of the automobiles in the environment of the automobile. The device may further be configured to transmit the transmission parameters based on the information on the position and based on a position of the automobile. The device may, for example, compare the position of the automobiles in the environment of the automobile with the position of the automobile and decide, whether sensor data of an automobile in the environment of the automobile is relevant or interesting for the automobile and provide the transmission parameters based on the relevance.

In at least some disclosed embodiments, the data messages on the status may further include information on available sensor measurements. The device may further be configured to transmit the transmission parameters based on the information on the available sensor measurements. The device may thus, for example, be configured to transmit the transmission parameters to automobiles whose sensor data is relevant or interesting for the automobile.

In some disclosed embodiments, the first interface may correspond to a vehicle-to-vehicle interface. The data messages on the status may, for example, correspond to Cooperative Awareness Messages, CAM. The CAM may, for example, include information on a state, a position, a motion vector or a short-term certificate for the authentication of the automobile which provided the CAM. The device may utilize this information to set up the second communication interface and provide transmission parameters in this respect.

In at least some disclosed embodiments, the device may further be configured to set up a data communication connection on the second radio interface with the further automobile. Via the data communication connection, for example, sensor data may be transmitted or data messages of automobiles in an environment of the automobile may be passed on.

In at least some disclosed embodiments, the device is configured to receive data messages on a status of automobiles in an environment of the automobile via the first radio interface. The device may further be configured to provide the data messages on the status of the automobiles in the environment of the automobile to the further automobile via the second radio interface. By transferring the data messages, the device may, for example, enable an extension of the transmission range of the further automobile or it may enable passing on the data messages to an automobile or a data collection point which are, for example, connected to the internet.

In some disclosed embodiments, the second radio interface may correspond to a mobile radio interface to a 5th generation (5G) mobile radio system. The device may be configured to generate a direct connection from device to device via the second radio interface. The direct connection from device to device may, for example, enable utilizing 5G radio technologies in areas in which no 5G radio cell is available.

In some disclosed embodiments, the first radio interface may correspond to a direct vehicle-to-vehicle-radio interface. The direct vehicle-to-vehicle-radio interface may, for example, enable a communication with transportation vehicles in an environment of the automobile. The second radio interface may correspond to an interface to a cellular mobile radio interface. The cellular mobile radio system may, for example, enable a higher transmission capacity between automobiles or a connection to the internet.

In at least some disclosed embodiments, the cellular mobile radio system may correspond to a Global System for Mobile Communications, GSM, a Universal Mobile Telecommunication Systems, UMTS, a Long-Term Evolution mobile radio system, LTE, a Long-Term Evolution Advanced mobile radio system, LTE-a, or a 5th generation mobile radio system, 5G. The cellular mobile radio system may, for example, enable a higher transmission capacity between automobiles or a connection to the internet.

In some disclosed embodiments, the first radio interface may be configured for a direct data communication with the further transportation vehicle. This can enable, for example, a simultaneous transmission of data, like, e.g., data messages on the status of a transportation vehicle, to a plurality of receivers.

The first radio interface may, for example, be configured for a direct data communication according to IEEE 802.11p (Standard 802.11p of the Institute of Electrical and Electronics Engineers). This may, for example, enable a direct transmission of data between transportation vehicles.

The second radio interface may be configured for a direct or indirect data communication with the further transportation vehicle. By a direct data communication, for example, a dependency on a base station may be reduced and latency may be decreased. The indirect data communication may enable a higher range.

Disclosed embodiments further provide a method for a vehicle-to-vehicle-data communication of an automobile with a further automobile. The method comprises receiving data messages on a status of automobiles in an environment of the automobile via a first radio interface. The data messages include pseudonym certificates of a vehicle-to-vehicle-data communication. The pseudonym Certificates enable a temporary identification of the automobiles in the environment of the automobile (transportation vehicles in the environment of the automobile which provide pseudonym certificates). The method further comprises providing, from the automobile to the further automobile and via the first radio interface, transmission parameters regarding a data communication between the automobile and the further automobile via a second radio interface, based on addressing the further automobile based on the pseudonym certificates. The first radio interface serves for a data communication of the automobile with the further automobile via a first data communication protocol and with a first transmission capacity. The second radio interface serves for a data communication of the automobile with the further automobile via a second data communication protocol and with a second transmission capacity which is higher than the first transmission capacity. The method further comprises setting up, based on the transmission parameters provided via the first radio interface, a radio connection between the automobile and the further automobile via the second radio interface.

Disclosed embodiments further provide a method for a vehicle-to-vehicle-data communication of an automobile with a further automobile. The method comprises providing, from the automobile to the further automobile and via a first radio interface, transmission parameters regarding a data communication between the automobile and the further automobile via a second radio interface. The first radio interface serves for a data communication of the automobile with the further automobile via a first data communication protocol and with a first transmission capacity. The second radio interface serves for a data communication of the automobile with the further automobile via a second data communication protocol and with a second transmission capacity which is higher than the first transmission capacity. The method further comprises setting up, based on the transmission parameters provided via the first radio interface, a radio connection between the automobile and the further automobile via the second radio interface.

Disclosed embodiments further provide a program having a program code for executing the method, when the program code is executed on a computer, a processor, a controller or a programmable hardware component.

Various embodiments will now be described with reference to the accompanying drawings in which some example embodiments are illustrated. In the figures, the thicknesses of lines, layers and/or regions may be exaggerated for clarity.

Like numbers refer to like or similar components throughout the following description of the included figures, which merely show some exemplary embodiments. Moreover, summarizing reference signs will be used for components and objects which occur several times in at least one disclosed embodiment or in at least one Figure but are described at the same time with respect to one or several features. Components and objects described with like or summarizing reference signs may be implemented alike or also differently, if applicable, with respect to one or more or all the features, e.g., their dimensioning, unless explicitly or implicitly stated otherwise in the description.

Although embodiments may be modified and changed in different ways, embodiments are illustrated as examples in the Figures and are described herein in detail. It is to be clarified, however, that it is not the intent to restrict embodiments to the respectively disclosed forms but on the contrary, embodiments are to cover all functional and/or structural modifications, equivalents, and alternatives falling within the scope of the disclosure. Same reference numerals designate same or similar elements throughout the complete description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted similarly (e.g., "between" versus "directly between," "adjacent" versus "directly adjacent," etc.).

The terminology used herein is for the purpose of describing certain embodiments only and is not intended to be limiting regarding these embodiments. As used herein, the singular forms "a," "an" and "the" are intended to include the plural forms as well, unless the context clearly indicates otherwise. It will be further understood that the terms like, e.g., "comprises," "comprising," "includes" and/or "including," when used herein, specify the presence of stated features, integers, operations, elements and/or components, but do not preclude the presence or addition of one or more other features, integers, operations, elements, components and/or groups thereof.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, are to be interpreted as having a meaning that is consistent with their meaning in the context of the relevant art and will not be interpreted in an idealized or overly formal sense unless expressly so defined herein.

5th generation mobile radio systems will quite probably provide a series of new concepts and changes. Some planned concepts, for example, include adaptively selecting frequencies and transmission paths and device-based data transmissions which are not cell-based. Big data volumes between devices may, for example, be transmitted past the core network (CN). In some concepts, millimeter wave transmission technology may provide higher data rates with a reduced range, while massive MIMO (Multiple Input Multiple Output) may help networks acquire a higher efficiency. In some concepts, smarter more powerful devices take over routine tasks.

5G mobile radio systems will here most probably comprise a lower latency, a higher data rate and a higher reliability than conventional mobile radio systems, like long-term evolution (LTE). Here, devices like, e.g., in machine-to-machine-communication (M2M) will be able to communicate directly among each other in some concepts. Symmetric data connections may here, for example, enable a transfer of data traffic (relaying) to communication partners.

For future application cases in data exchange between road users, in some cases a transmission capacity of conventional vehicle-to-x-data communication systems may not be sufficient to exchange sensor data. At least some disclosed embodiments utilize direct device-to-device-connections, as they will probably be supported in mobile radio systems of the 5th generation to transmit sensor data between automobiles.

Figure 1:
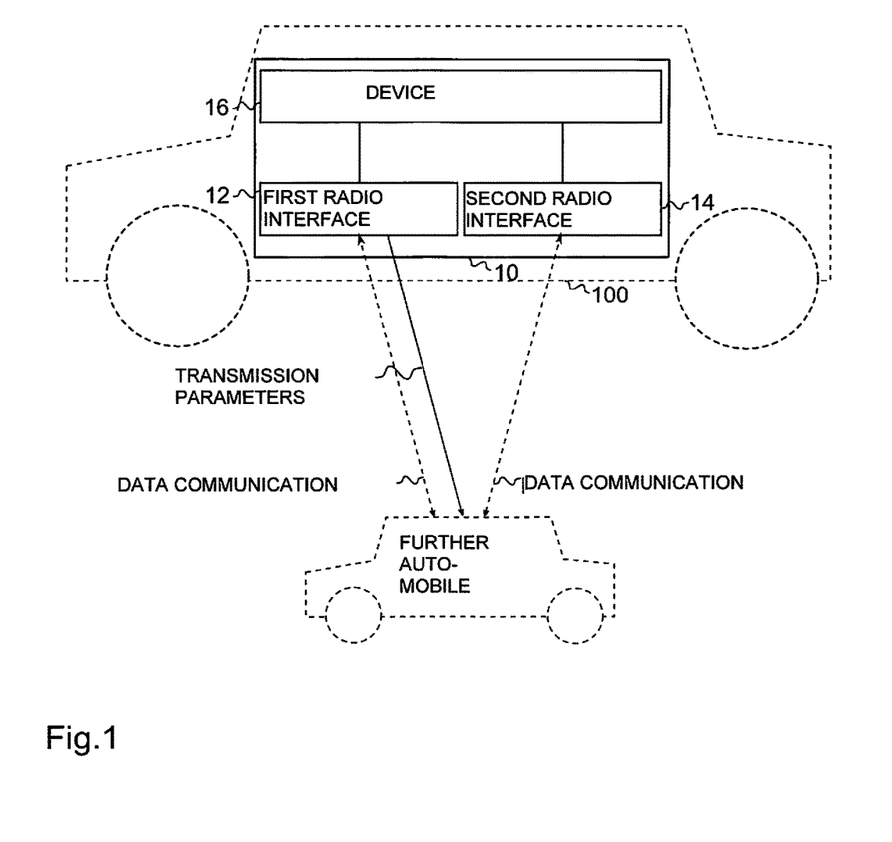
FIG. 1 shows a block diagram of a disclosed embodiment of an apparatus for a vehicle-to-vehicle data communication of an automobile.

FIG. 1 shows a block diagram of an embodiment of an apparatus for a vehicle-to-vehicle data communication of an automobile 100. The vehicle-to-vehicle data communication may, for example, correspond to an exchange of transportation vehicle data, like, e.g., positions, motion vectors, sensor data etc. between transportation vehicles. These may, for example, correspond to a vehicle-to-vehicle communication standard, like standards of the Car2Car consortium, e.g., standards of the European Telecommunications Standards Institute EN 302 637-2, EN 302 637-3, EN 302 663, EN 302 636-4-1/2, EN 302 636-5-1, EN 302 636-6-1, TS 102 539-1, TS 102 539-2 or TS 102 539-3.

The apparatus 10 comprises a first radio interface 12 for a data communication of the automobile with a further automobile via a first data communication protocol and with a first transmission capacity. The apparatus further comprises a second radio interface 14 for a data communication of the automobile with the further automobile via a second data communication protocol and with a second transmission capacity. The second transmission capacity is greater than the first transmission capacity. In some disclosed embodiments, the first radio interface 12 corresponds to a direct vehicle-to-vehicle radio interface. The first radio interface 12 may, for example, be configured for a direct data communication with the further automobile, for example, according to IEEE 802.11p. The second radio interface 14, may, for example, correspond to an interface to a cellular mobile radio system. The second radio interface 14 may, for example, be configured for a direct or indirect data communication with the further automobile. The direct data communication may, for example, correspond to a data communication in which only the apparatus 10 and the further automobile take part. The indirect data communication may correspond to a communication via a further entity, for example, via a base station or a network of a mobile radio provider. A connection which was set up with the help of a base station (for example, by allocating radio resources) but otherwise only takes place between the apparatus 10 and the further automobile, may in some disclosed embodiments be regarded as a direct data connection. In some disclosed embodiments, the first radio interface 12 may enable transmitting data messages via a shared channel and/or the first radio interface 12 may enable transmitting data messages without a multilateral connection setup and/or the first radio interface 12 may correspond to a broadcast radio interface for broadcasting data messages to a plurality of receivers. In some disclosed embodiments, the first radio interface 12 may communicate via frequencies in a 5.9 GHz frequency range (e.g., between 5.85 GHz and 5.925 GHz).

The apparatus further comprises a device 16 for providing, via the first radio interface 12, transmission parameters regarding a data communication between the automobile and the further automobile via the second radio interface.

The device 16 is configured to receive data messages on a status of automobiles in an environment of the automobile 100 via the first radio interface 12. The data messages include, for example, pseudonym certificates of a vehicle-to-vehicle data communication. The pseudonym certificates enable a temporary identification of the automobiles in the environment of the automobile 100. Providing the transmission parameters may be based on addressing the further automobile based on the pseudonym certificates.

The control module 16 may, for example, be configured to transmit the transmission parameters if data is to be transmitted which requires a higher transmission capacity.

In at least some disclosed embodiments, the transmission parameters may include at least one element of the group of frequency resource, frequency band, modulation, time resource, antenna direction, beamforming parameters, protocol and supported capabilities of the second radio interface 14. In some disclosed embodiments, the device 16 may be configured to determine the transmission parameters, for example, based on observing a frequency range via the second radio interface 14 and/or the device 16 may be configured to obtain transmission parameters, for example, from a base station of a mobile radio system.

In some disclosed embodiments, the first interface 12 may correspond to a vehicle-to-vehicle interface, for example, for a direct communication between automobiles. The automobile may exchange data messages with automobiles in its environment, for example, via the first interface 12. The data messages may, for example, include a status (like a position and a motion vector) of the automobile. The Cooperative Awareness Messages (periodic data messages which a transportation vehicle sends out to indicate its presence to other transportation vehicles) are an example for such data messages. These data messages may, for example, receive current information on the automobile, for example, the position and the motion vector, but also sensor data like acceleration, speed and the like, for example. The device 16 may, for example, be configured to receive data messages (datagrams) on a status of automobiles in an environment of the automobile 100 via the first radio interface 12.

Some sensors, for example, video sensors, may generate amounts of data which may partially not be transmitted via such periodic data messages due to their size. For example, sensor data may also comprise requirements regarding an upper limit of latency which may not be adhered to with periodic data messages, for example, when passing on video data for a remote control of a transportation vehicle or as a visual aid for other transportation vehicles.

In such cases, for example, the device 16 may further be configured to set up a data communication connection on the second radio interface with the further automobile. For example, this sensor data may then be transmitted via the second radio interface which provides a higher transmission capacity. The transmission capacity may, for example, relate to a greater bandwidth or to a greater amount of simultaneously transmitting transportation vehicles, which may be acquired, for example, by utilizing beam forming whereby a spatial division of the transmission spectrum may provide a greater transmission capacity. In some disclosed embodiments, the second radio interface may further comprise a lower latency than the first radio interface, for example, when the first transmission protocol is based on periodic data messages (like CAM).

In some disclosed embodiments, the data messages on the status may further include information on available sensor measurements. In many cases not all sensor measurements are equally relevant for all transportation vehicles or driving situations. For example, in a difficult driving situation video data of a preceding transportation vehicle may make overtaking more secure, may not be utilized in other situations, however, for example. Or different transportation vehicles may have different representation or analysis devices. The device 16 may further be configured to transmit the transmission parameters based on the information on the available sensor measurements. For example, the device 16 may be configured to transfer the transmission parameters to automobiles whose available sensor data is relevant for the automobile 100 in a current or predictable driving situation, for example, before overtaking or when merging into a motorway slip road.

In some disclosed embodiments, data messages on the status may further include information on a position of the automobiles in the environment of the automobile 100. The device 16 may further be configured to further transmit the transmission parameters based on the information on the position and based on a position of the automobile 100. The device 16 may, for example, be configured to identify automobiles in its environment whose sensor data is relevant in certain driving situations. For example, by doing so, the one data message among the received data messages may be identified which was transmitted by automobiles which are in close proximity to the automobile 100 and which are moving in the same (or opposite) direction, for example. Based on their position, the device 16 may, for example, transmit the transmission parameters and, for example, set-up a data connection via the second radio interface 14 to transmit the relevant sensor data.

The transmission of the transmission parameters is here in at least some disclosed embodiments based on an identification of the further automobile. In some disclosed embodiments, data messages may include digital short-term certificates for a temporary identification of the automobiles in the environment of the automobile 100. The device 16 may be configured to provide the transmission parameters to the further automobile based on the digital short-term certificates. The digital short-term certificates may, for example, correspond to pseudonym certificates of a vehicle-to-vehicle-data communication which are, for example, included in a CAM. Pseudonym certificates, for example, allow an authentication of a transportation vehicle which transmitted the CAM without giving clear conclusions regarding the transmitter. In some disclosed embodiments, pseudonym certificates are generated from long-term certificates, have a shorter validity period than the same, wherein a plurality of pseudonym certificates is valid simultaneously and used alternatingly to complicate tracking.

For example, the device 16 may be configured to take over the digital short-term certificate of the further automobile into a data message, so that the further automobile may determine that this data message was determined for the further automobile when receiving the data message. On a random access channel or contention-based channel this may, for example, enable addressing the further automobile. The further automobile may then, for example, utilize the transmission parameters to set up the data connection with the automobile 100.

In an exemplary implementation, the second radio interface 14 may, for example, correspond to a mobile radio interface of a 5th generation, 5G, mobile radio system. The device 16 may, for example, be configured to generate a direct connection from device to device via the second radio interface 14. The device 16 may, for example, be configured to identify frequency bands and resources which are utilized for a data transmission via the second radio interface 14 to, for example, determine data transmission resources which may be utilized for a direct communication from device to device. In this respect, the device 16 may, for example, be configured to monitor data transmission resources utilized for control channels of the mobile radio system to find out whether network coverage of the mobile radio system is available. If same is not available, the device 16 may, for example, determine the transmission parameters based on the data transmission resources which may be utilized for a direct communication from device to device. The device 16 may, for example, utilize these data transmission resources to set up a data connection with the further transportation vehicle.

In at least some disclosed embodiments, the device 16 may be configured to provide an internet protocol (IP) address of the automobile 100 or the apparatus 10 as transmission parameters or in addition to the transmission parameters to the further automobile. An IP address may, for example, be utilized to address entities via the second radio interface 14. The further automobile may utilize the IP address, for example, to set up a connection to the automobile 100 and/or the apparatus 10. The device 16 may be configured, for example, to receive an IP address of the further automobile via the first radio interface 12. For example, the further automobile may be configured to provide its IP address to the apparatus 10 based on a pseudonym certificate of the automobile 100 or the IP address of the automobile 100 or the apparatus 10. The device 16 may, for example, be configured to set up a direct connection to the further automobile based on the IP address of the further automobile or set up a direct connection to the further automobile and allocate an IP address to the same. For example, the IP address of the automobile may be based on the pseudonym certificate. In some disclosed embodiments, the device 16 is configured to set up the connection and/or to communicate based on an IP address of the apparatus 10 or the automobile 100 and the IP address of the further automobile.

If the device 16 determines a network coverage of the mobile radio system, this may trigger, for example, the setup of a direct data connection via a base station of the mobile radio system and, for example, receive the transmission parameters from the base station and provide the same to the further automobile via the first radio interface. The transmission parameters may here, for example, include frequency or further data transmission resources which the base station allocated to the direct connection of the apparatus 10 to the further automobile.

In some disclosed embodiments, the device may 16 be configured to provide the data messages on the status of the automobiles in the environment of the automobile 100 to the further automobile via the second radio interface 14. For example, the device 16 may be configured to pass on the data messages via the second radio interface 14.

In an exemplary embodiment, the apparatus 10 may be configured to make sensor data available for being used in autopilots or assistance systems of automobiles. For a further automation, apart from additional sensor technology also an exchange of sensor data with the surrounding transportation vehicles is desirable to make driving comfortable. The performance of the communication technology may significantly decide how comfortable the driving function may be. For a positioning frequently highly topical maps are loaded from the backend (server in a core network of a mobile radio system or in an enterprise network) into the transportation vehicle. In the opposite direction localization data may be sent to the backend to map current changes for automatic driving in the maps. The safety may in some disclosed embodiments be improved again by the exchange of sensor data by transportation vehicles comparing their own observations with those of other transportation vehicles. By this it is enabled in some disclosed embodiments to operate automated and manually driven transportation vehicles in mixed traffic as also non-communicating transportation vehicles are detected and their driving performance is communicated and better integrated into planning. Safety-relevant communication between transportation vehicles is more difficult in conventional mobile radio systems as an end-to-end latency is too high and frequently strongly increases already with only moderate numbers of participants in the cells.

An end-to-end delay in a range below 10 ms (target 1 ms) is desirable to enable cooperative rescheduling in case of an unexpected event, e.g., ball or game on the road. Traffic jam situations may require a communication of thousands of participants within one communication cell. Thus, for example, in a traffic jam of 5 km on a three-lane motorway, approx. 2500 transportation vehicles and their passengers need to communicate. It may be desirable to guarantee communication independent of the network provider and increase reliability. At least some disclosed embodiments may enable an availability and distribution of sensor data also in areas poorly or not covered by a mobile radio system by passing on data messages on sensor data which they received via the first 12 or second 14 radio interface. In some disclosed embodiments, the device 16 may be configured to pass on data messages on sensor data which it received via the first 12 or second 14 radio interface via the first 12 or second 14 radio interface to automobiles in an environment of the automobile 100. For example, the device 16 may also be configured to receive data messages on map material via the first 12 or second 14 radio interface and pass the same on to automobiles in an environment of the automobile 100 via the first 12 or second 14 radio interface. This may enable convenience functions, like, e.g., at least partially automated driving which may be safer, more efficient and environmentally friendly than conventional individual mobility. For example, the device 16 may be configured to provide transmission parameters via the first radio interface 12 for passing on and to set up a connection via the second radio interface 14 based on the transmission parameters.

Figure 2:
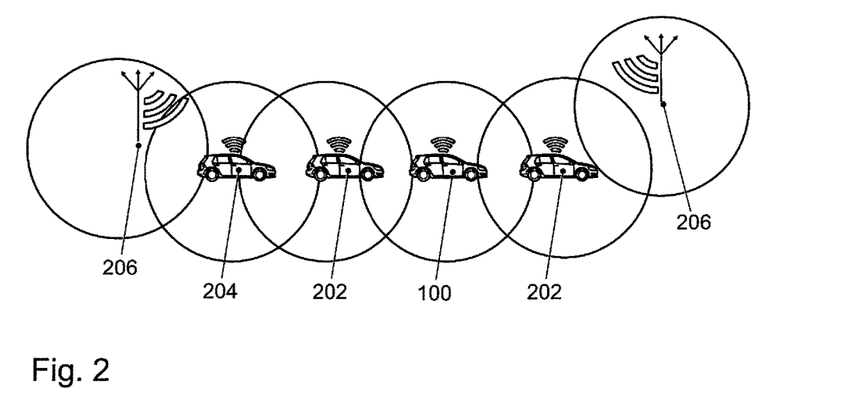
FIG. 2 shows an exemplary embodiment of a transfer of data messages.

FIG. 2 shows an exemplary embodiment of an automobile 100 including the apparatus 10. The device 16 may, for example, be configured to receive data messages of the further automobiles 202 and/or pass on data messages to the same. The automobiles 202 further include the apparatus 10 which is configured to pass on the data messages, for example, to an automobile 204 or a base station 206 of a mobile radio system. This way it may be enabled, for example, that the transportation vehicle 100 pass on the data messages with sensor data and/or that the transportation vehicle 100 which, in the exemplary embodiment, has no direct access to the mobile radio system, may provide and/or receive data messages, which may, for example, comprise sensor data, via the base station 206 of the mobile radio system.

Highly automated driving may enable driving for disabled people who are not able to drive a transportation vehicle on their own. As for highly automated driving the intervention of the transportation vehicle driver may still be necessary or automated driving may not be possible due to the environment, remote-controlled driving offers an extreme increase of mobility for these people. The actual driver may be sitting in a head office and guide the automobile through areas in which automated driving is not possible. Further, this driver may take over control of the transportation vehicle if a driver of the transportation vehicle is not able to take over control any more for health reasons, heart attack, diabetes shock, etc. Here, the rescue chain may be significantly shortened if rescuer and person to be rescued move towards each other. Using conventional mobile radio systems an implementation seems not to be possible due to latency and coverage problems.

An end-to-end delay in the range below 10 ms (target 1 ms) seems necessary to enable remote controlled driving without the driver in the head office suffering from sickness, a phenomenon which is also referred to as "gaming sickness" and is based on the delay between drive signal and reaction in the video representation. It seems to be desirable also in case of a traffic jam to guarantee the low-latency high-resolution video transmission. A communication independent of the network operator seems desirable just like an increased reliability of data transmission.

At least some disclosed embodiments may enable an availability and distribution of sensor data with a reduced latency also in areas poorly or not covered by a mobile radio system by passing on data messages on sensor data which they received via the first 12 or second 14 radio interface. In some disclosed embodiments the device 16 may be configured to pass on data messages on sensor data, like, for example, video sensor data, which it received via the first 12 or second 14 radio interface, via the first 12 or second 14 radio interface to automobiles and/or infrastructure entities in an environment of the automobile 100. For example, the device 16 may also be configured to receive data messages on video sensor data via the first 12 or second 14 radio interface and pass the same on to automobiles or infrastructure entities, like base stations of the mobile radio system or a control center of a traffic infrastructure in an environment of the automobile 100 via the first 12 or second 14 radio interface. This may enable safety when driving and mobility also for groups of users which have up to now been excluded therefrom. By utilizing the automotive communication technology for relaying, remote controlled driving may also take place in areas in which no network coverage of the mobile radio system is available. For example, the device 16 may be configured to provide transmission parameters via the first radio interface 12 for passing on and to set up a connection via the second radio interface 14 based on the transmission parameters.

An automobile, for example, the automobile 100, may, for example, correspond to a land transportation vehicle, a watercraft, an aerial transportation vehicle, a rail transportation vehicle, a road transportation vehicle, an automobile, an off-road transportation vehicle or a truck.

In at least some disclosed embodiments, the cellular mobile radio system may correspond to a Global System for Mobile Communications (GSM), a Universal Mobile Telecommunication Systems (UMTS), a Long-Term Evolution mobile radio system (LTE), a Long-Term Evolution Advanced mobile radio system (LTE-A), or a 5th generation mobile radio system, 5G. The cellular mobile radio system or also mobile radio communication network may, for example, correspond to a mobile radio system.

Disclosed embodiments may thus use a radio interface configured for communicating data via a mobile radio system to a server or computer or another communication partner who may, for example, be reached via the internet and/or the World Wide Web (www) or a different network. The mobile radio system may, for example, correspond to one of the mobile radio systems standardized by corresponding standardization groups, like, e.g., the 3rd Generation Partnership Project (3GPP) group. For example, the same include the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), like, e.g., the Universal Mobile Telecommunication System (UMTS), Long Term Evolution (LTE) or LTE-Advanced (LTE-A), or also mobile radio systems of other standards, like, e.g., the Worldwide Interoperability for Microwave Access (WIMAX), IEEE802.16 or Wireless Local Area Network (WLAN), IEEE802.11, and generally a system based on a Time Division Multiple Access (TDMA), Frequency Division Multiple Access (FDMA), Code Division Multiple Access (CDMA), Orthogonal Frequency Division Multiple Access (OFDMA) or a different technology and/or method of multiple access. In the following, the terms mobile radio system, mobile radio network, mobile communication system and mobile radio system are used interchangeably.

The device 16 may, for example, correspond to a control module or a calculation module. In disclosed embodiments, the device 16 and/or the control module/calculation module may correspond to any controller or processor or a programmable hardware component. For example, the device 16 and/or the control module/calculation module may also be realized in software which is programmed for a corresponding hardware component. In so far, the device 16 and/or the control module/calculation module may be implemented as a programmable hardware with a correspondingly adapted software. Here, any processors, like digital signal processors (DSPs) may be used. Disclosed embodiments are not restricted to a certain type of processor here. Any processor or also several processors are possible for implementing the device 16 and/or the control module/calculation module.

Figure 3:
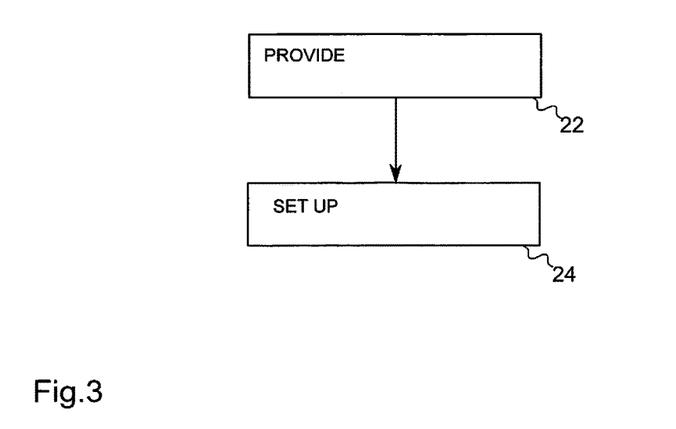
FIG. 3 shows a flow chart of a disclosed embodiment of a method for a vehicle-to-vehicle data communication of an automobile.

FIG. 3 shows a flow chart of an embodiment of a method for a vehicle-to-vehicle data communication of an automobile with a further automobile. The method comprises receiving data messages on a status of automobiles in an environment of the automobile via a first radio interface. The data messages include pseudonym certificates of a vehicle-to-vehicle-data communication. The pseudonym certificates may enable a temporary identification of the automobiles in the environment of the automobile. The method comprises providing 22, from the automobile to the further automobile and via the first radio interface, transmission parameters regarding a data communication between the automobile and the further automobile via a second radio interface, based on addressing the further automobile based on the pseudonym certificates. The first radio interface serves for a data communication of the automobile with the further automobile via a first data communication protocol and with a first transmission capacity. The second radio interface serves for a data communication of the automobile with the further automobile via a second data communication protocol and with a second transmission capacity which is higher than the first transmission capacity. The method further comprises setting up 24, based on the transmission parameters provided via the first radio interface, a radio connection between the automobile and the further automobile via the second radio interface.

A further disclosed embodiment is a computer program for executing at least one of the above described methods when the computer program is executed on a computer, a processor or a programmable hardware component. A further disclosed embodiment is a digital storage medium which is machine or computer readable and comprises electronically readable control signals which may cooperate with a programmable hardware component so that one of the above described methods is executed.

Features disclosed in the above description, the following claims and the included figures may both individually and also in any combination be implemented and of importance for the realization of an embodiment in different implementations.

Although some embodiments were described in connection with an apparatus, it is obvious that these may also represent a description of a corresponding method, so that a block or a member of an apparatus may also be regarded as a corresponding method operation or as a feature of a method operation. Analogously, embodiments described in the context of or as a method operation also represent a description of a corresponding block or detail or feature of a corresponding device.

Depending on certain implementation requirements, disclosed embodiments may be implemented in hardware or in software. The implementation may be executed using a digital storage medium, for example, a floppy disk, a DVD, a blue ray disc, a CD, an ROM, a PROM, an EPROM, an EEPROM or a flash memory, a hard disk or another magnetic or optical memory on which electronically readable control signals are stored which may or do cooperate with a programmable hardware component such that the respective method is executed.

A programmable hardware component may be formed by a processor, a computer processor (CPU; central processing unit), a graphics processing unit (GPU), a computer, a computer system, an application specific integrated circuit (ASIC), an integrated circuit (IC), a system on chip (SOC), a programmable logics element or a field programmable gate array (FPGA) comprising a micro-processor.

The digital storage medium may be machine or computer readable. Some disclosed embodiments include a data carrier which comprises electronically readable control signals which are able to cooperate with a programmable computer system or a programmable hardware component such that one of the methods described herein is executed. An embodiment this is a data carrier (or a digital storage medium or a computer readable medium) on which the program for executing one of the methods described herein is recorded.

Generally speaking, disclosed embodiments may be implemented as a program, firmware, a computer program or computer program product having a program code or as data, wherein the program code or the data may be operable to execute one of the methods, when the program is executed on a processor or a programmable hardware component. The program code or the data may, for example, be stored on a machine readable carrier or data carrier. The program code or the data may, among others, be present as a source code, machine code or byte code or any other intermediate code.

A further disclosed embodiment is a data stream, a signal sequence or a sequence of signals which represent the program for executing one of the methods described herein. The data stream, the signal sequence or the sequence of signals may, for example, be configured such as to be transferred via a data communication connection, like, e.g., via the internet or any other network. Disclosed embodiments consequently also is data representing signal sequences suitable for being transmitted via a network or a data communications connection, wherein the data represents the program.

A program according to at least one disclosed embodiment may, for example, implement one of the methods during its execution by reading out memory locations or writing one or several pieces of data into the same, whereby possibly switching processes or other processes in transistor structures, in amplifier structures or in other electrical, optical, magnetic or components operating according to another functional principle are caused. Accordingly, by reading out a memory location, data, values, sensor values or other information may be detected, determined or measured by a program. By reading out one or several memory locations a program may thus detect, determine or measure quantities, values, measured quantities and other information and cause, initiate or execute an action by writing into one or several memory locations and control other devices, machines and components.

The above described embodiments merely represent an illustration of the principles of the present disclosure. It is obvious that modifications and variations of the arrangements and details described herein are obvious for other persons skilled in the art. It is intended that the disclosure is only limited by the scope of the following claims and not by the specific details which were presented herein using the description and the explanation of the embodiments herein.

REFERENCE SIGNS 10 apparatus
12 first radio interface
14 second radio interface
16 device
22 provide
24 set-up
100 automobile
202 further automobile
204 further automobile
206 base station

The invention claimed is:

1. An apparatus for a vehicle-to-vehicle data communication of a transportation vehicle, the apparatus comprising:
a first radio interface for a data communication of the transportation vehicle with a further transportation vehicle via a first data communication protocol and with a first transmission capacity;
a second radio interface for a data communication of the transportation vehicle with the further transportation vehicle via a second data communication protocol and with a second transmission capacity, wherein the second transmission capacity is higher than the first transmission capacity; and
a device configured to:
receive data messages indicating a status of other transportation vehicles in an environment of the transportation vehicle via the first radio interface via direct connection, wherein the data messages include pseudonym certificates of the vehicle-to-vehicle data communication, wherein the pseudonym certificates enable a temporary identification of the other transportation vehicles in the environment of the transportation vehicle, and
provide, via the first radio interface, transmission addressing parameters for data communication between the transportation vehicle and the further transportation vehicle temporarily identified by pseudonym certificate, wherein the transmission addressing parameters are for data communication via the second radio interface, wherein the device sets up a dedicated connection with the further transportation vehicle via the second radio interface for transmission of transportation vehicle sensor data, at the higher, second transmission capacity, wherein the dedicated connection is set up with a corresponding device of the further transportation vehicle based on the transmission addressing parameters provided via the first radio interface, and wherein the devices of the transportation vehicle and the further vehicle communicate over the dedicated connection at the higher, second transmission capacity over the second radio interface.

2. The apparatus of claim 1, wherein a control module transmits the transmission addressing parameters in response to a determination that data is to be transmitted requiring a higher transmission capacity.

3. The apparatus of claim 1, wherein the data messages indicating the status further include information on a position of the transportation vehicles in the environment of the transportation vehicle, and wherein the device also transmits the transmission addressing parameters based on the information on the position and based on a position of the transportation vehicle.

4. The apparatus of claim 1, wherein the data messages indicating the transmission addressing parameters are based on the information on the available sensor measurements.

5. The apparatus of claim 1, wherein the first radio interface is a vehicle-to-vehicle interface and wherein the data messages indicating the status are Cooperative Awareness Messages.

6. The apparatus of claim 1, wherein the device receives the data messages indicating the status of the other transportation vehicles in the environment of the transportation vehicle via the first radio interface and wherein the device also provides data messages indicating the status of the other transportation vehicles in the environment of the transportation vehicle to the further transportation vehicle via the second radio interface.

7. The apparatus of claim 1, wherein the second radio interface is a mobile radio interface to a 5th generation, 5G, mobile radio system.

8. The apparatus of claim 1, wherein the first radio interface is a direct vehicle-to-vehicle radio interface, and/or wherein the second radio interface is an interface to a cellular mobile radio system.

9. The apparatus of claim 8, wherein the cellular mobile radio system is one of a Global System for Mobile Communications, a Universal Mobile Telecommunication System, a Long-Term Evolution mobile radio system, a Long-Term Evolution Advanced mobile radio system, or a 5th generation mobile radio system.

10. The apparatus of claim 1,
wherein the first radio interface is configured for direct data communication with the further transportation vehicle,
wherein the first radio interface is configured for direct data communication according to IEEE 802.11p, and/or wherein the second radio interface is configured for direct or indirect data communication with the further transportation vehicle.

11. A method for a vehicle-to-vehicle data communication of a transportation vehicle with a further transportation vehicle, the method comprising:
receiving data messages indicating a status of transportation vehicles in an environment of the transportation vehicle via a first radio interface, wherein the data messages include pseudonym certificates of the vehicle-to-vehicle data communication, wherein the pseudonym certificates enable a temporary identification of the transportation vehicles in the environment of the transportation vehicle;
providing, from the transportation vehicle to the further transportation vehicle and via the first radio interface, transmission parameters regarding a data communication between the transportation vehicle and the further transportation vehicle via a second radio interface, based on addressing the further transportation vehicle based on the pseudonym certificates, wherein the first radio interface serves for a data communication of the transportation vehicle with the further transportation vehicle via a first data communication protocol and with a first transmission capacity and wherein the second radio interface serves for a data communication of the transportation vehicle with the further transportation vehicle via a second data communication protocol and with a second transmission capacity which is higher than the first transmission capacity; and
setting up, based on the transmission parameters provided via the first radio interface, a radio connection between the transportation vehicle and the further transportation vehicle via the second radio interface,
wherein a dedicated connection is set up with the further transportation vehicle via the second radio interface for transmission of transportation vehicle sensor data, at the higher, second transmission capacity, wherein the dedicated connection is set up with the further transportation vehicle based on the transmission addressing parameters provided via the first radio interface, and wherein the transportation vehicle and the further vehicle communicate over the dedicated connection at the higher, second transmission capacity over the second radio interface.

12. The method of claim 11, wherein a control module transmits the transmission addressing parameters in response to a determination that data is to be transmitted requiring a higher transmission capacity.

13. The method of claim 11, wherein the data messages indicating the status further include information on a position of the transportation vehicles in the environment of the transportation vehicle, and wherein the transmission addressing parameters are transmitted based on the information on the position and based on a position of the transportation vehicle.

14. The method of claim 11, wherein the data messages indicating the transmission addressing parameters are based on the information on the available sensor measurements.

15. The method of claim 11, wherein the first radio interface is a vehicle-to-vehicle interface and wherein the data messages indicating the status are Cooperative Awareness Messages.

16. The method of claim 11, wherein the data messages indicating the status of the other transportation vehicles in the environment of the transportation vehicle are received via the first radio interface and wherein the data messages indicating the status of the other transportation vehicles in the environment of the transportation vehicle are provided to the further transportation vehicle via the second radio interface.

17. The method of claim 11, wherein the second radio interface is a mobile radio interface to a 5th generation, 5G, mobile radio system.

18. The method of claim 11, wherein the first radio interface is a direct vehicle-to-vehicle radio interface, and/or wherein the second radio interface is an interface to a cellular mobile radio system.

19. The method of claim 18, wherein the cellular mobile radio system is one of a Global System for Mobile Communications, a Universal Mobile Telecommunication System, a Long-Term Evolution mobile radio system, a Long-Term Evolution Advanced mobile radio system, or a 5th generation mobile radio system.

20. The method of claim 11, wherein the first radio interface is configured for direct data communication with the further transportation vehicle, wherein the first radio interface is configured for direct data communication according to IEEE 802.11p, and/or wherein the second radio interface is configured for direct or indirect data communication with the further transportation vehicle.

21. A non-transitory computer readable medium including a program having a program code for executing a method for a vehicle-to-vehicle data communication of an transportation vehicle with a further transportation vehicle, when the program code is executed on a computer, a processor, a controller or a programmable hardware component, the method comprising:
receiving data messages on a status of transportation vehicles in an environment of the transportation vehicle via a first radio interface, wherein the data messages include pseudonym certificates of a vehicle-to-vehicle data communication, wherein the pseudonym certificates enable a temporary identification of the transportation vehicles in the environment of the transportation vehicle;
providing, from the transportation vehicle to the further transportation vehicle and via the first radio interface, transmission parameters regarding a data communication between the transportation vehicle and the further transportation vehicle via a second radio interface, based on addressing the further transportation vehicle based on the pseudonym certificates, wherein the first radio interface serves for a data communication of the transportation vehicle with the further transportation vehicle via a first data communication protocol and with a first transmission capacity and wherein the second radio interface serves for a data communication of the transportation vehicle with the further transportation vehicle via a second data communication protocol and with a second transmission capacity which is higher than the first transmission capacity; and
setting up, based on the transmission parameters provided via the first radio interface, a radio connection between the transportation vehicle and the further transportation vehicle via the second radio interface, wherein a dedicated connection is set up with the further transportation vehicle via the second radio interface for transmission of transportation vehicle sensor data, at the higher, second transmission capacity, wherein the dedicated connection is set up with the further transportation vehicle based on the transmission addressing parameters provided via the first radio interface, and wherein the transportation vehicle and the further vehicle communicate over the dedicated connection at the higher, second transmission capacity over the second radio interface.

22. The non-transitory computer readable medium of claim 21, wherein a control module transmits the transmission addressing parameters in response to a determination that data is to be transmitted requiring a higher transmission capacity.

23. The non-transitory computer readable medium of claim 21, wherein the data messages indicating the status further include information on a position of the transportation vehicles in the environment of the transportation vehicle, and wherein the transmission addressing parameters are transmitted based on the information on the position and based on a position of the transportation vehicle.

24. The non-transitory computer readable medium of claim 21, wherein the data messages indicating the transmission addressing parameters are based on the information on the available sensor measurements.

25. The non-transitory computer readable medium of claim 21, wherein the first radio interface is a vehicle-to-vehicle interface and wherein the data messages indicating the status are Cooperative Awareness Messages.

26. The non-transitory computer readable medium of claim 21, wherein the data messages indicating the status of the other transportation vehicles in the environment of the transportation vehicle are received via the first radio interface and wherein the data messages indicating the status of the other transportation vehicles in the environment of the transportation vehicle are provided to the further transportation vehicle via the second radio interface.

27. The non-transitory computer readable medium of claim 21, wherein the second radio interface is a mobile radio interface to a 5th generation, 5G, mobile radio system.

28. The non-transitory computer readable medium of claim 21, wherein the first radio interface is a direct vehicle-to-vehicle radio interface, and/or wherein the second radio interface is an interface to a cellular mobile radio system.

29. The non-transitory computer readable medium of claim 28, wherein the cellular mobile radio system is one of a Global System for Mobile Communications, a Universal Mobile Telecommunication System, a Long-Term Evolution mobile radio system, a Long-Term Evolution Advanced mobile radio system, or a 5th generation mobile radio system.

30. The non-transitory computer readable medium of claim 21, wherein the first radio interface is configured for direct data communication with the further transportation vehicle, wherein the first radio interface is configured for direct data communication according to IEEE 802.11p, and/or wherein the second radio interface is configured for direct or indirect data communication with the further transportation vehicle.

* * * * *